United States Patent [19]

Gyugyi et al.

[11] Patent Number: 5,198,746
[45] Date of Patent: Mar. 30, 1993

[54] TRANSMISSION LINE DYNAMIC IMPEDANCE COMPENSATION SYSTEM

[75] Inventors: Laszlo Gyugyi, Penn Hills Twp., Allegheny County; Colin D. Schauder, Murrysville Boro, both of Pa.

[73] Assignee: Westinghouse Electric Corp., Pittsburgh, Pa.

[21] Appl. No.: 760,627

[22] Filed: Sep. 16, 1991

[51] Int. Cl.$^5$ ............................................. G05F 1/70
[52] U.S. Cl. .................................... 323/207; 363/39; 307/102; 307/105
[58] Field of Search .................. 363/39, 40; 323/207; 307/102, 105

[56] References Cited

U.S. PATENT DOCUMENTS

| | | | |
|---|---|---|---|
| 4,513,240 | 4/1985 | Putman | 363/39 X |
| 4,639,846 | 1/1987 | Dähler et al. | 363/39 |
| 4,697,131 | 9/1987 | Schauder et al. | |
| 4,805,082 | 2/1989 | Heinrich et al. | |
| 4,812,669 | 3/1989 | Takeda et al. | 307/105 |
| 4,843,513 | 6/1989 | Edris | 307/105 X |
| 4,870,557 | 8/1989 | Stacey | |

Primary Examiner—Emanuel T. Voeltz
Attorney, Agent, or Firm—J. L. Brzuszek; T. H. Martin

[57] ABSTRACT

A series impedance compensation system for a set of transmission lines which are used for electrical power transmission, with these parallel lines being protected from the transient faults and dynamic subsynchronous oscillation problems. These problems can become aggravated by the introduction of capacitor banks which thus serve as only a partial solution to the disturbances of transient faults during conventional recovery modes of operation. The impedance compensation system is coupled in series to each transmission line to dynamically balance the inductor impedance on the transmission line, responsive to demand, by injecting a voltage component determined to be optimized substantially at quadrature leading or lagging phase angles (±90°) with respect to the transmission line voltage and current components. The impedance compensation system includes a circuit based solid-state switching power converter with self-commutating thyristor or GTO semiconductor switches connected in a parallel shunting arrangement with reverse poled or freewheeling diodes. This is done in order to provide either an absorptive component or a generated component of output pole voltage carrying a 90° segment of the output current in each cycle, as this provides dynamic stability without fostering subsynchronous resonance.

16 Claims, 5 Drawing Sheets

FIG. 6C

TRANSMISSION LINE DYNAMIC IMPEDANCE COMPENSATION SYSTEM

BACKGROUND OF THE INVENTION

This invention relates in general to electrical impedance balancing systems, and more particularly, to a transmission line impedance compensation system for dynamically balancing a reactive voltage component on the transmission line responsive to conditions on demand.

The invention is particularly applicable to a three-phase transmission line system which is operated at elevated voltage, current and other electromagnetic field parameters in order to provide efficient electric power transmission. The transmission of electric power ranges over vast easement corridors which attract the likelihood of and are subjected to prolific fault conditions at various times. These include events such as a distribution of lightning strikes, as well as, natural and unavoidable fault bridging events, which occur in or out of operational high power consumption periods. These problematic events cause impedance changes in the respective power transmission lines which may last either momentarily or for prolonged periods of time until cleared by burn-through and physical removal.

Figure 1:
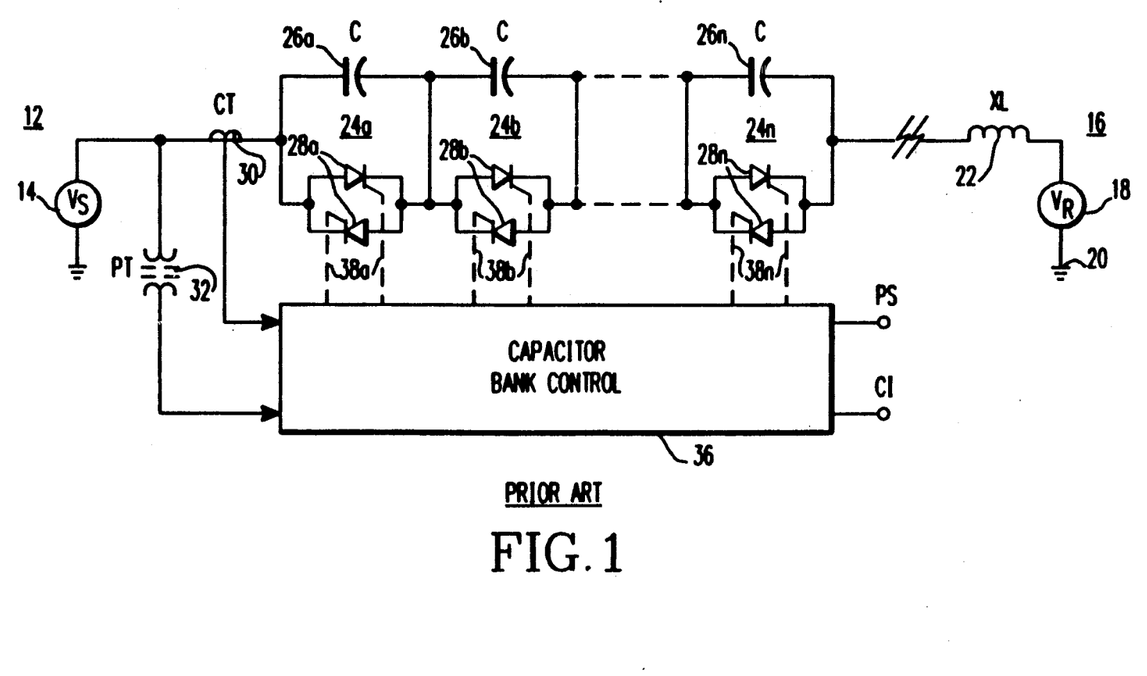
FIG. 1 is a schematic circuit diagram of thyristor-switched capacitors in a controllable series compensation impedance system for one-phase of an electric power transmission system, in accordance with the prior art.

Electrical impedance balancing circuit arrangements for transmission line systems have heretofore comprised serially connected capacitors (often referred to as series connected). A classical series circuit transmission line connection is defined with the relevant actively compensating capacitors experiencing the same current. A thyristor-switched capacitor arrangement in FIG. 1 is illustrative of the prior art. Transmission line components are rated in a voltage class, or series of classes, typically within an overall range from about 240 Kilo-Volts (KV) to about 750 KV, for the high voltage potential of the transmission line operational characteristic for this type of circuit. One of the problems has been that the capacitor banks, operated at those relatively high voltage potentials, must be each controlled by a similarly voltage rated bypass switch or valve. These switches are comprised of a circuit chain of reverse parallel connected thyristors which are operated at the high voltage potential of the transmission line.

The above-described arrangement provides relatively fast transmission line impedance control to change the degree of series impedance compensation for the transmission line. The bypass switches constituted by the thyristor pairs are each connected to a data channel that must be provided with voltage breakdown isolation between the relatively high transmission line voltage potential and a control circuit which is based at ground voltage or a relatively low reference voltage potential, and this is well below the line voltage potential magnitude. Aside from the considerable time and cost of engineering and other skills needed for the development, manufacture, installation and maintenance of the high voltage hardware suitable for the task, a capacitor switching circuit arrangement does at least partially fulfill, by cancelling a part of the inductive reactive impedance of the transmission line, the objective of increasing the power transmitting capability of the transmission line.

One of the principal problems with transmission line electrical impedance balancing circuits of this type is that the electrical resonance effect, which can occur when the inductive reactance of the transmission line and the switched-in series compensating capacitive reactance coincide with a specific frequency. This frequency is the difference between the line frequency and one of the mechanical resonant frequencies of the rotating elements of the combined generator and turbine system, and it can cause "subsynchronous resonance". This type of resonance is the oscillation that results in an oscillatory machine torque that can cause an increasing or growing oscillation of the shaft speed about a steady-state frequency. A dangerous mode of operation is the result, so much so as to cause damage to the turbine shaft and, consequentially worse, the catastrophic breakage of said shaft. Should this breakage occur, the downtime for repair or replacement of essential system components is a monumental financial burden further considering the irretrievable loss of operating revenue, as well as the jeopardy of accumulated good will from power system users.

Another problem with electrical impedance balancing circuits of this type is that there may be a sudden sharp increase or decrease in the transmitted electric power. This is a problem because electrical transmission systems are frequently subjected to disturbances over a wide spectrum of severity or types. Some examples given above are lightning strikes and line faults, but other disturbances occur when large loads are being switched on and off. Other types of disturbances include the insertion or deletion of some power generators, and likewise, there is a problem when some of the parallel transmission lines are being switched on and off. A problem arises if the disturbance results in a sudden sharp increase or decrease in the transmitted electrical power, and this cannot be immediately matched by a change in the mechanical output power of the turbines which drive the power generators. Consequently, the generators are forced to accelerate or decelerate with the presence of oscillations, thereby affecting rotational speed and angular shaft position. This alters the amount of power transmitted even so much as to cause a temporary power shutdown in order to prevent an even more serious loss of equipment.

It is known to provide a voltage-source inverter with a fixed voltage DC link in high performance motor drive applications such as in U.S. Pat. No. 4,697,131 entitled, "Voltage Source Inverter and Variable Frequency, Constant Voltage AC Motor Drive Embodying The Same", which patent is assigned to the same assignee as the present application. This U.S. patent is hereby incorporated by reference into the present application and will be hereinafter referred to as the incorporated U.S. Patent. It teaches a regeneration mode of operation in which a motor drive is reliant on diode means in preparing for recovery after a controlled power switch has interrupted the current path. The diode means also is used to bypass the controlled power switch in the forward power mode of operation of the motor drive.

The above referred type of voltage-source inverter is used in an adaptive situation to maximize the amount of inductance inserted in a variable voltage DC-link, according to U.S. Pat. No. 4,805,082 entitled "Regenerative Two-Quadrant Converter", which is assigned to the same assignee as the present invention. Maximized inductive insertion is done by using a GTO device or a transistor to interrupt the main current so as to reduce the harmonic content thereof. It also is used to limit the rate of rise of a fault current in the event of a "shoot-through" among the thyristors of the converter bridge while in the regenerative mode. An additional static switch is thus provided for a separate bypass for the inductance energy through which to "freewheel" so as to help build up and thereby minimize the duration of a zero-current condition in the bridge at the moment of commutation.

An object of the present invention is to utilize some of the considerations from the above described voltage-source inverter and converter circuits and to apply them independently in a controllable series compensation circuit for dynamically balancing the reactive impedance in a transmission line system. This is done to provide static and dynamic stability while producing enhanced efficiency of power transmission.

SUMMARY OF THE INVENTION

In accordance with the present invention, a transmission line impedance compensation system is provided for dynamically injecting, responsive to demand, a phase quadrature AC voltage at the fundamental frequency in series with the transmission line.

The impedance compensation system generally injects a phase quadrature AC voltage, for leading or lagging phase angles, in series with the transmission line so that the resultant phase-quadrature voltage is controllable substantially about zones defined at each of +90 and −90 electrical degrees. The injection of the phase quadrature voltage is done by a solid-state switching power converter found in a class of DC to AC converters known as "voltage source inverters", and it is operated from an energy storage capacitor.

The power converter has normal and fault current modes of operation with the latter being used for doubling the maximum normal current capability of the inverter circuit arrangement of thyristors or GTO switches. The switches are held continuously conductive by a control means, during fault current conditions, instead of being switched at a regular rate during the time period of the fault. Each of the plurality of GTO semiconductor switches are self-commutating and each is connected across a parallel shunting circuit including a reverse poled or freewheeling diode.

The impedance compensation system with a voltage source inverter is operated with minimized real power requirements and provides a means for detecting a machine disturbance if the machine is actively connected in the transmission line. This is done by detecting the presence of accelerating or decelerating rotational machine speeds, based on the measurement of the steady state transmission angle which is the phase angle difference between the transmission line sending end and receiving end voltages.

In accordance with another aspect of the invention, the detecting means for a machine disturbance recognizes whether the sign of the mathematical derivative of the transmission angle is positive or negative. A negative sign corresponds to a condition of machine acceleration caused by greater mechanical input power than transmitted electrical power in order to signal the need for decreasing the transmission line inductive reactive impedance, and conversely with a positive sign, to signal the need for increasing same. The signed transmission angle is proportional to the integral of the variation of the real power transmitted. The derivative of the transmission angle, the transmitted electrical power, and the output phase-quadrature voltage of the compensating means are controlled between maximum capacitive reactance and inductive reactance values of output voltage in order to minimize the "first cyclic-swing" of these parameters with respect to time.

Another aspect of the impedance compensation system is provided by the control means including feedback sensors affecting the control by sensing input transmission line voltage and current, rotational velocity or shaft speed and system oscillation frequency of an affected rotational machine in a generator-turbine system. The sensors respond to the system which generates a resonant subsynchronous frequency oscillation having a side-band frequency resulting from the carrier frequency modulated with one of the mechanical resonant frequencies of the machine connected in the transmission line power system.

BRIEF DESCRIPTION OF THE DRAWINGS

The invention may be better understood, and further advantages and uses thereof made more readily apparent, when considered in view of the following detailed description of exemplary embodiments taken with the drawings in which.

DETAILED DESCRIPTION OF THE PREFERRED EMBODIMENTS

This invention is a new and improved transmission line impedance compensation system which injects a phase quadrature (±90°) AC voltage into the line from a voltage-source inverter. The inverter includes a controlled arrangement of GTO (Gate Turn-Off semiconductor device) switches operating from a capacitor DC voltage source with negligible real power requirements. The measurement of a steady-state transmission angle represents the phase angle difference between the transmission line sending end and receiving end voltages.

A three-phase electric power transmission system is implemented with the described impedance compensation system, and this is preferred for long, or very long, electric power transmission lines where the line impedance may become too high for economical power transmission to occur, even though the transmission system voltage may be chosen to be as high as 500 kV (kilo-volts) or higher. Acknowledgement has been directed, in the introductory remarks, to switching-in capacitor banks of suitable rating in series with the transmission line in order to cancel at least part of the inductive reactive impedance, as this does generally increase the power transmitting capability of a transmission line. This is done, however, at the expense of introducing a potentially significant problem called "subsynchronous resonance", which the present invention is especially suited to eliminate as well as to provide other beneficial operating stability and fault recovery modes.

The new and improved transmission line impedance compensation system and method are described by illustrating only those parts of a long transmission line system pertinent to the understanding of the invention. The supplemental portions of a voltage-source inverter used in the regeneration mode of operation in a motor drive has been incorporated by reference from U.S. Pat. No. 4,697,131. Another voltage-source inverter used to maximize the amount of inductance inserted in a variable voltage DC-link with a GTO device or a transistor to interrupt the main current reducing harmonic content thereof. It is also used to limit the rate of rise of a fault current in the event of a "shoot-through" of the converter bridge while in the regenerative mode, as incorporated by reference from U.S. Pat. No. 4,805,082 as disclosed.

The implementation of these or similar voltage-source inverters into an electric power transmission line system is for the purpose of injecting a quadrature ($\pm 90°$) output voltage from them into a coupled series circuit with the transmission line. This is for dynamically balancing the reactive impedance of the transmission line system as the goal of the present disclosure so as to provide static and dynamic stability while producing enhanced efficiency of power transmission.

An example of prior art electric power transmission line with controllable series capacitive compensation is shown in FIG. 1, although it is doubtful that this has yet been reduced to practice in the field of high-voltage transmission lines. This control philosophy employs rapidly switchable capacitors to provide capacitive reactance at a power transmission frequency by employing methods and techniques which are similar to those developed for parallel circuit or shunt-connected static VAR (Volt-Amps Reactive) generators and compensators, which are familiar to those who are skilled in the art of AC voltage power circuits. The showing in FIG. 1 is taken to be a prior art implementation, nevertheless, of a transmission line series compensation system 10 which shows a ladder-like circuit arrangement of switchable capacitor banks 24a, 24b, . . . 24n which are respectively connectable in series with a long transmission line 22. The transmission line is connected between the first switchable capacitor bank 24a and the last switchable capacitor bank 24n which is each in turn connected to a sending end generator grid 12 and a receiving end generator grid 16.

The transmission line is represented by a lumped inductance 22 having a value L measured per mile or kilometer in units of henries per unit of distance. This provides a convenient representation for the inductive reactance $X_L$ for the transmission line 22 which is determined by the frequency of the power voltage which is a sine wave, in the U.S. most commonly with a periodicity of 1/60 sec. or the reciprocal value of 60 Hertz. The transmission line system is simplified by a single sending end AC generator 14 having a sine wave periodicity of for example, 60 Hertz in the U.S. and 50 Hertz in many of the nations in Europe, and this is connected to the first switchable capacitor bank 24a. A current transformer 30 is used for coupling the series transmission line current which is also sinusoidal to capacitor bank control 36. The transmission line current passing through each of the respectively switchably connected series capacitors 26a, 26b, . . . 26n which are energized according to the compensation demand to cause the desired voltage drop across each respective capacitive reactance $X_C$. These voltage drops may be assumed to be of similar value if the value of each capacitor C in farads is similar. Otherwise, different pattern configurations of capacitor circuit values may be used in order to provide a graded effect for the distributed reactance parameters depending on proximity to the sending and receiving ends of the ladder network of switchable capacitor banks described. The receiving end generator grid 16 is terminated with a receiving end AC generator 18 having a similar sinusoidal terminal voltage $V_R$ which may initially be assumed to run in synchronism at the same generating frequency that the U.S. or other countries utilizing this standard for power generation frequencies.

The current transformer 30 senses the transmission line current and forms an input to a capacitor bank control circuit 36 which is also energized by the voltage on the transmission line at the sending end 12. The voltage is coupled through a potential transformer 32 which is used for measuring the transmission line voltage and directly influences the operation of the capacitor bank control 36. There are two other inputs shown for the capacitor bank control 36 which enter from the opposite side portion thereof, and these are designated by the acronyms PS for Parameter Setting and CI for Control Inputs which are for the adjustability of this series compensation scheme to better match the conditions of the controller.

The capacitor bank control circuit 36 is referenced at ground potential which is assumed to be the reference for the receiving end generator reference ground potential 20 and likewise for the sending end generator 14. Otherwise, ground current loops of zero sequence current may affect the system with results less predictable or more complex and difficult to understand. A basic circuit synopsis of this sort is not intended but rather this arrangement should lend itself to analytical power circuit analysis as known from symmetrical component theory and design considerations.

The degree of series capacitive compensation is increased by increasing the number of capacitor banks 26n in series circuit with the transmission line and is reciprocally decreased by decreasing the number of capacitive series banks. It is fundamental to operation that each capacitive bank C with an associated switching-bypass thyristor pair 28a, 28b, . . 28n respectively connected thereacross, provide a reversible short circuit across the associated capacitor bank when gate drive is applied through respective gate drive connections 38a, 38b, . . . 38n. Gate drive is supplied accordingly from the capacitor bank control circuit 36 according to a control logic which continuously derives the required degree of compensation by measuring appropriate system input parameters. These system parameters most likely would include the line voltage, line current, and frequency, and the capacitor bank control 36 should automatically activate the respective capacitor bank C by open-circuiting the normally short-circuited respective thyristor-switch 28a, 28b, ... 28n. Removal of the gate drive does provide the switching action so that the individual thyristors block the positive and negative going sinusoidal voltage transitions as soon as the gate drive current crosses zero.

The transmission series compensation approach described with respect to FIG. 1 provides in principle a relatively fast control operation in order to change the degree of series compensation responsively to affect the line impedance for changing conditions. Its shortcomings are that it can only provide a step-like change in the compensation which may be seen to diminish in step value when a relatively large number of capacitor banks and a correspondingly large number of shunting thyristor-switch pairs is used. This would be needed in order to meet the resolution requirements for uniform damping of individual generators in a complex multi-machine power system. The relatively simple series capacitive compensation scheme becomes more difficult to realize in practice when viewed from the perspective that the switchable capacitor banks are placed in series at the exemplary high 500 kV transmission line voltages. Since they are resident at these high values, they have to be operated while insulated at the high line voltage potentials while the capacitor bank control circuit 36 resides at ground or reference potential. This is near zero volts and thus there must be isolation with data channels for the control channel elements 38a, 38b, ... 38n. Sophisticated materials and design considerations are needed in order to withstand the potential gradient which exists and which may present hazardous working conditions for any workmen who are present in the immediate vicinity of the data channels 38n and capacitor bank control 36. This presents a hazard in proximity to the extremely high voltage potential of a transmission line which is planned for as part of the control strategy for the present compensation system. The control platforms upon which the switchable capacitor banks 24a, 24b, ... 24n are resident still must be on isolated floating platforms which makes such an arrangement large and relatively expensive.

There is another problem that exists which relates to the need for meeting an exquisite timing requirement for the capacitor bank insertion, since shunting of a capacitor bank C must coincide with the transmission line system voltage zero-crossing points and transmission line current zero-crossing points, respectively. There is a limited response time which exists for the relatively fast thyristor switching which may make capacitor bank switching unsuitable for the requirement of active damping of subsynchronous oscillations. These oscillations tend to get out of hand if not damped by rapidly controlled compensation within the first few cycles after a power system disturbance. There is also a problem of energy transfer which requires that a thyristor-switch capacitor C cannot become energized to operating voltage without a high transient current being generated at the time that the capacitor bank C is shunted by the thyristor switch; this may develop into sustained oscillation when capacitor switching is repeated at a sufficiently high rate.

The thyristor-switch capacitor banks, constituting a controllable series compensation impedance system for an electric power transmission system, may constitute a workable solution to meet the less stringent resolution requirements of some systems with less complex or lower number multi-machine power systems. It is the purpose of the present invention, however, to substitute a three-phase inverter system in order to inject continuous series reactive compensation, as a substitute for the switchable capacitor banks 24a, 24b, ... 24n described in conjunction with the thyristor switching-bypass pairs 28a, 28b, .. 28n and likewise provide a substitute for the associated gate drives through isolated control channels 38a, 38b, ... 38n.

Voltage-Source Inverter Compensation

Figure 2:
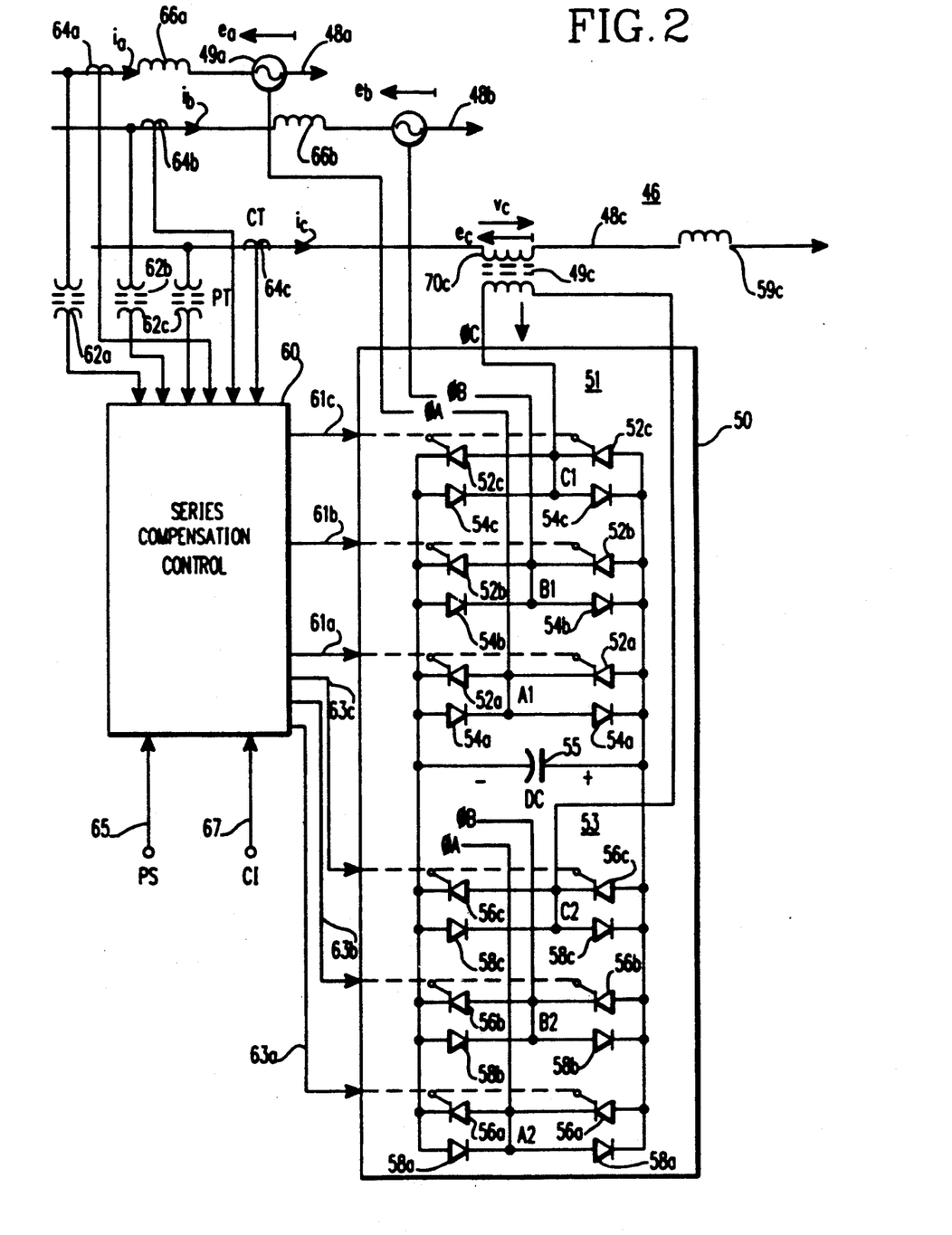
FIG. 2 is a partial block diagram and schematic circuit of a controlled voltage-source, three-phase inverter system, providing series compensation according to the invention.

The present invention introduces a controlled inverter circuit 46 in FIG. 2, according to an expanded phase C showing for a three-phase transmission-line implementation. This is predicated on a method of and apparatus for using a voltage-source inverter circuit 50 in a manner which uniquely injects a voltage at the fundamental supply frequency (normally 60 Hertz) into the respective electric power transmission phase lines 48a, 48b, 48c. This is done in order to oppose the voltage drop $V_L$ developed across the inductive line impedance $X_L$, as at 59c and 22 in FIG. 1, which impedance is at the same fundamental frequency. The resulting voltage drop, combining $v_c$, with $V_L$, would be equivalent to that of a shorter transmission-line, a lower value of total inductance L, and a smaller value of resulting inductive reactance $X_L$. This is accomplished by the injection of an AC voltage $e_c$ which has a quadrature phase relationship with the series transmission line current $i_c$ at the fundamental supply frequency, stated for this example to be 60 Hz.

The rotating voltage phasor $v_c$ lags the likewise rotating current phasor $i_c$ by 90 electrical degrees, according to the traditional phasor analysis of AC circuit relationships according to Ohm's law. The amplitude of the injected AC voltage $e_c$ is made proportional to that of the transmission line current $i_c$ so that it compensation equivalent to that obtained with a series circuit capacitor that was switched into the transmission line circuit of FIG. 1 operating at the fundamental frequency of operation of the AC system. The invention includes injecting a series compensation quadrature voltage into the transmission line and anticipates an improvement in stability with the injection of an AC voltage into each of the phases of a three-phase transmission line system with each phase being restricted to the fundamental frequency of the system. This provides superior series compensation to that obtained with capacitive series compensation. Undesired electrical resonances are obviated from the transmission line network so that subsynchronous resonance is not permitted to occur in the system.

The voltage-source inverter 50 of FIG. 2 constitutes the compensating means coupled in series with the transmission line 48c, and it includes a first compensating circuit unit 51 connected in parallel circuit with a DC storage capacitor 55, with assumed polarity as indicated. This capacitor 55 is also connected in parallel circuit with a second compensating circuit unit 53 in a ladder-like configuration. The ladder elements for the first and second compensating circuit units 51, 53 are comprised of Gate Turn-Off (GTO) semiconductor switching devices 52, 56 which are capable of operating at the requisite switching rates for a fixed and relatively slow changing power frequency. Other static devices may be preferred in some other operational applications since switching speed is only one of several considerations where voltage and power rating are to be met. The choice made for pole switches is to provide rectangular waveforms which are of the type shown in FIG. 2 of incorporated-by-reference U.S. Pat. No. 4,870,557. These waveforms are characteristic for each of the first and second compensating circuit units 51, 53 which are well known in the art of harmonic neutralized high power inverters as the constituent six-pulse bridge inverter circuits. The utilization of well-known six-pulse bridge inverter circuits as modular building block components for six-pulse, twelve-pulse, and twenty-four-pulse systems provides simpler transformer arrangements.

Transformer configurations which employ relatively standard transformers in power systems with voltage-source inverters, according to the incorporated-by-reference U.S. Pat. No. 4,870,557, only eliminate some of the harmonics, since the output voltages may have included distortion or higher frequency harmonics which can be reduced by appropriate filtering techniques. Harmonics are more fully canceled by more pervasive harmonic neutralization techniques such as in taught in incorporated-by-reference U.S. application Ser. No. 07/679,484 filed on Apr. 2, 1991 (Case W.E. 55,454). The reference teaches a method and apparatus for harmonic neutralization which was developed principally for six-pulse inverters, and it is unique for its centralized notching with respect to quarter-period phase segments. It provides an apparent harmonic neutralization for an aircraft generator embodiment with results similar to a twenty-four-pulse harmonic neutralization result taught in the incorporated U.S. application for U.S. Ser. No. 07/612,647 filed on Nov. 13, 1990 (Case W.E. 56,104).

The above incorporated U.S. references are mentioned as an adjunct to the present invention for series compensation which has its operation restricted to the fundamental frequency as a superior mode to that of switched capacitive series compensation. Voltage components other than quadrature voltage components ($\pm 90°$) for $e_c$ may also be injected at selected frequencies and appropriate phase positions, in addition to the fundamental frequency component at about 60 Hz. Electrical damping of subsynchronous oscillations may occur due to existing series capacitive banks in the transmission line, reference teachings which suggests that with the proper implementation of transformer connections and controlled switching with a series inverter control circuit 60, this will provide reduction for harmonic distortion which may be present in a transmission line system. This effect can be realized ancillary to the fundamental frequency series compensation with quadrature voltage injection which is seen as fundamental to both of these methodologies.

The preferred implementation mentioned above utilizes a selected class of DC-to-AC converters termed "voltage-sourced inverters". There are various types of solid-state switching converters that can be used to generate the AC voltage required for transmission-line series compensation. The present inverter uses within the first compensating circuit unit 51, a group of six self-commutated semiconductor switches arranged in the fashion of three GTO source-pairs of thyristor switches 52a, 52b, 52c. Each GTO thyristor is shunted in a parallel circuit with a reverse-parallel associated diode 54a, 54b, 54c, and this is commonly referred to as a free-wheeling diode. It functions to permit the reverse current to flow in a return path during appropriate portions of the cycle when the GTO associated with it is being switched sequentially. This provides a first set of pole output voltages A1, B1, C1 which are phase-displaced 120 electrical degrees with respect to each other in a 360-degree periodic cycle. The second compensating circuit unit 53 is similarly structured and is constituted by GTO source-pair thyristors 56a, 56b, 56c with freewheeling diodes 58a, 58b, 58c for reverse shunting in order to provide sequentially phase displaced by 120° second set of pole output voltages A2, B2, C2.

These first and second sets of pole output voltages are associatively paired with each respective phase for the coupling transformer to be energized from the first and second compensating unit pairs 51, 53 of pole output voltages. Exemplary of this for one phase of the series compensation is phase C with C1 to C2 connected across the primary winding of a series coupled transformer 70c. Coupling is through a transformer core to a secondary voltage winding 49c connected in series circuit with 70c the transmission line phase C transmission line 48c of the electric power transmission system. Similarly phases A, symbolic representations 49a, 49b each in series with their respective phase transmission lines 48a, 48b. Each transformer thereby produces a series coupled compensation voltage $e_a$, $e_b$, respectively, with injection into the appropriate timing phase (displaced 120°) of operation from the voltage-source inverter circuit 50.

Inductance 66a, 66b represent power transformer phase leakage inductances that couples the respective voltage-source inverter into the transmission line. These are minimized by design but still represent additional inductance in series with the inductance of the transmission line. The transmission line inductance 59c is shown for phase C in series with the winding inductance since this is a more complete circuit showing then the symbolic representation of voltage sources 49a, 49b in these phase lines.

The series transformer control 60 provides the switch timing appropriately from phase-sensing of the currents $i_a$, $i_b$, $i_c$, from their respective current transformers 64a, 64b, 64c. The line potential or voltage from each phase of the transmission line is sensed with potential or voltage transformers 62a, 62b, 62c which inputs to the series transformer control. Further inputs 65, 67 are respectively designated PS and CI which are acronyms representing parameter setting and control inputs. There are output control switching lines 61a, 61b, 61c for the first compensating circuit unit 51 and similarly lines 63a, 63b, 63c are for the second compensating circuit unit 53 in order to operate the respective GTO inverter switches. This is done to provide the generated voltage waveforms for the switch poles in order to provide the above-designated pole voltages and the resulting line-to-line voltages $V_{AB}$, $V_{BC}$, and $V_{CA}$. The line-to-line voltages are represented by a familiar three-level alternating step-like pattern in a proper phase sequence. These six current and voltage waveforms are mentioned but not shown in the drawings of the present disclosure since they are familiar and may be easily found in the prior art representations such as are found in FIG. 2 designated as prior art in the incorporated-by-reference U.S. patent application 07/612,647 (Case W.E. 56,104).

The significance of using a controlled voltage-source inverter for series compensation of a normally inductive transmission line is with respect to the responsiveness thereof. Series capacitive reactive compensation means that each of the transmission line currents for this compensation lead by 90° the respective injected voltages $e_a$, $e_b$, $e_c$, and this corresponds to the condition of capacitive reactive power generation or simply VAR generation. The operation of the voltage-source inverter when reversing the polarity of the inverter output voltages $e_a$, $e_b$, $e_c$, will cause each of the line currents associated therewith to appear to lag these respective voltages by 90°. The injected voltage thereby becomes additive in the same phase with the inductive reactive voltage of the transmission line. The inductance of the transmission line is a function of the inductance unit or henry per unit measure of distance of the transmission line. Introducing inductive reactance is represented as VAR absorption. The operation of the voltage-source inverter 50 for leading and lagging currents demonstrates that each GTO thyristor 52, 56 and reverse-paired diode 54, 58 within an associated compensated circuit switching unit 51, 53 carries alternatively a 90° segment of the output current in each cycle.

The quadrature or ±90° phase relationships that exist between the voltages $e_a$, $e_b$, $e_c$ and the respectively associated transmission line currents $i_a$, $i_b$, $i_c$ permits the voltage-source inverter to be solely operated from the DC storage capacitor 55. This is possible because, theoretically, the inverter handles only pure reactive power. The GTO thyristors, however, are not entirely lossless, and they cause some of the energy stored in the capacitor 55 to be used up for internal losses. These losses can be supplied from the AC system by making the inverter voltage lag the associated transmission line current by somewhat less than 90°. The inverter then absorbs a small amount of real power from the AC system to replenish these mentioned internal losses and, moreover, keeps the capacitor voltage at the desired level by increasing or decreasing the DC capacitor voltage level. This same loss replenishment control mechanism for making the voltage-source inverter circuit compensating voltage lag the transmission line current by an angle somewhat smaller than 90° may be increased to lag at an angle somewhat greater than 90°. This may be used to control the amplitude or magnitude of the AC output voltage for increased or decreased compensation. Zero inverter voltage corresponds to the situation when the compensation is zero and zero reactive impedance is injected into the transmission line.

External and Internal Control

Figure 5:
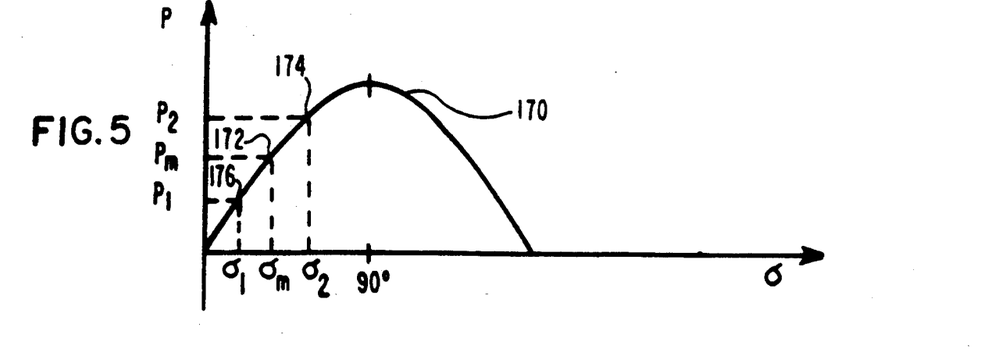
FIG. 5 is a half-period of a sine-like Power Engineering curve which graphs Power as a function of transmission angle δ which is the difference angle between the phase of a sending end machine rotor and the phase of a receiving end machine rotor.

The most intriguing portion of the controlled voltage-source inverter is the inverter control circuit 60 which controls the magnitude and the phase position of the inserted voltages in order to provide series compensation for the transmission line system. The clarity of purpose becomes more evident when considered from the perspective of FIG. 5 which is a graphic illustration of a sine-like Power Engineering curve which plots transmission system Power (P) as a function of transmission angle (δ) which is the difference angle between the phase of a sending-end machine rotor at one end of a transmission line and the phase of a receiving-end machine rotor at the receiving end. This curve is thus set forth as an equation for power or wattage.

$$P = \frac{V_S \cdot V_R}{X} \sin \delta \qquad \text{Eq. (1)}$$

$V_S$ = is the sending end generator terminal voltage.
$V_R$ = is the receiving end generator terminal voltage.
$X$ = is the reactive impedance of the transmission line or the combination of the inductive reactance of the transmission line inductance and any diminishing reactance which is in quadrature therewith, such as capacitive reactance from any series compensating capacitance and any injected voltage capacitive reactance, as with the present invention.

Any disturbance on the transmission line, such as line to ground or line to line fault bridging events which occur in or out of the operational periods, cause impedance changes in the respective power transmission lines. When large loads are switched on and off or some power generators in the transmission line system are switched on and off, this also creates line disturbances. This causes the phase of the sending and receiving end generator voltages $V_S$, $V_R$ to start to lose synchronism with each other so that a change in the transmission angle, δ, causes an operating power point ($P_M$) on the power curve, 170 at 172 and $\delta_M$ transmission angle, to slide downwardly to point 176. Operating power is thereby a diminished value of $P_1$ at a transmission angle $\delta_1$ for diminished transmission line power transfer capability. An increase in power transmission line capability slides upward on the sine-like curve 170 to point 174 which corresponds to an increased value for power transmission $P_2$ at a somewhat higher value of transmission angle $\delta_2$, since it is closer to 90° on the abscissa. Since the sin 90° = 1, it corresponds to the maximum value of power corresponding to the maximum transmission angle indicated. The transmission angle dynamically changes according to the conditions within the transmission line system. This includes the internal operation of the solid-state inverter with respect to the amplitude and phase angle of the inserted compensating voltage. The measurement and analysis of various transmission line system parameters, including line voltages, line currents, operating frequency, and machine rotational velocity are fundamental to carrying out the control of the compensation "in real time". This also determines the relative success of obviating subsynchronous oscillations by the speed and executed.

An internal control methodology for the series inverter control circuit is based on a mathematical model using instantaneous vectors for the three-phase voltage and current sets on the AC or transmission-line side of the inverter. The three line currents are described instantaneously by a single current vector which is the vector sum of perpendicular orthogonal current vector components $i_{ds}$ and $i_{qs}$. These components are the respective abscissa, ordinate (x, y) component values which vectorially add to provide a single instantaneous current vector according to the next equation.

$$i_{dqs} = \sqrt{i_{ds}^2 + i_{qs}^2} \qquad \text{Eq. (2)}$$

This instantaneous single current vector is associated with an angle of the current vector relative to the abscissa or the ds-axis of the coordinate system. Theta (θ) is the angle that may be defined in terms of the component current vector magnitudes $i_{ds}$ and $i_{qs}$ according to the next equation, which is an arctangent relationship familiar to those skilled in the art.

$$\theta = \tan^{-1} \frac{i_{qs}}{i_{ds}} \qquad \text{Eq. (3)}$$

A vectorial representation in ds, qs (coordinates which are transformable to a rotating frame of reference (dq) in which the d-axis is always coincident with the line current vector which is rotating at a constant speed $\omega = 2\pi f$ where f is the operating frequency in Hertz. It is sufficient to observe that in this reference frame, the components of a series voltage vector represented as real component $e_d$ and reactive component $e_q$ also account for the instantaneous real and reactive power which may be drawn from the transmission line according to the following expressions:

$$\text{Real Power } P = \frac{3}{2} i_{dqs} \cdot e_d \qquad \text{Eq. (4)}$$

$$\text{Reactive Power } Q = \frac{3}{2} i_{dqs} \cdot e_q \qquad \text{Eq. (5)}$$

Where:
$i_{dqs}$ has been previously defined in Eq. (2).

Figure 3:
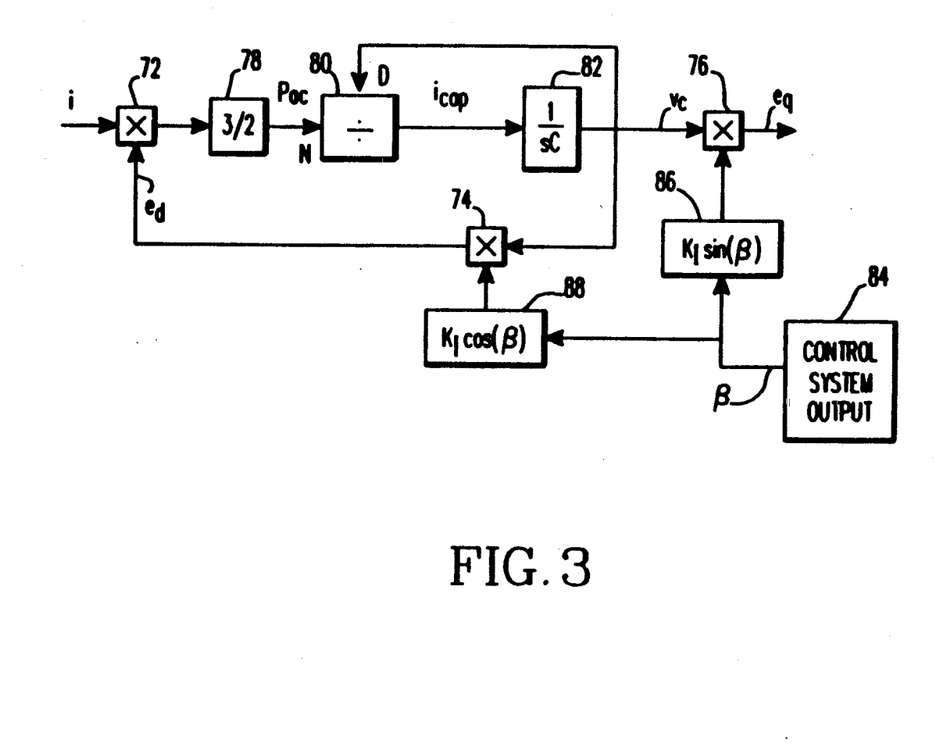
FIG. 3 is a control flow diagram for series compensation for the invention of FIG. 2.
Figure 4:
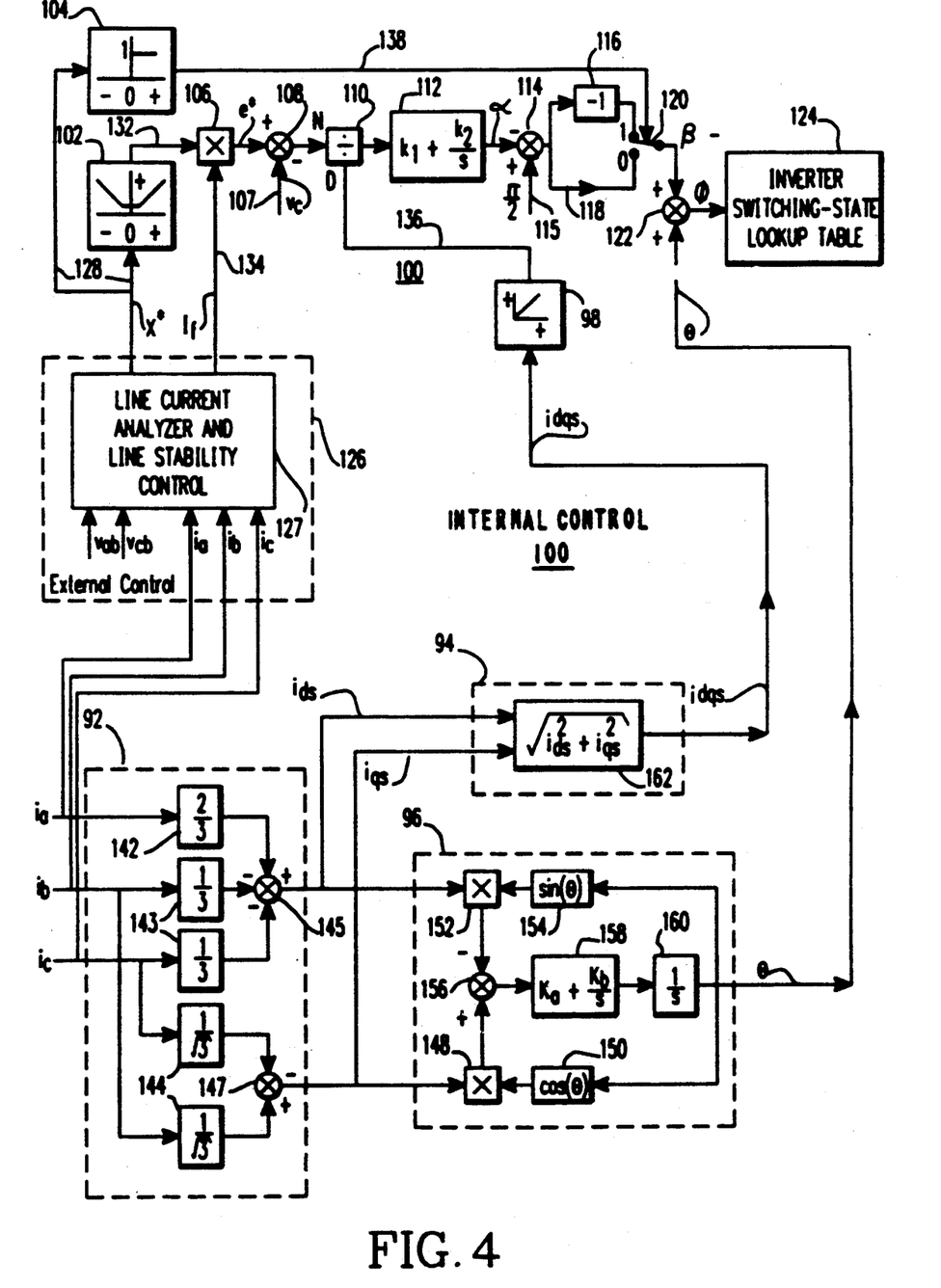
FIG. 4 is an external control interface to internal control flow diagram, based on the series compensator showing of FIG. 3, with feedback control signals for calculating a vector current magnitude developed from measured current values with an angle of line current vector developed from a phase-locked loop.

The above-stated vector and real and reactive power component definitions can be used to establish a control flow diagram for series compensation which is shown in FIG. 3, from which an external control interface to internal control flow diagram of FIG. 4 may be realized. First consider that in the control flow diagram of FIG. 3, the single vector current $i_{dqs}$ is regarded as representative of the transposed transmission line currents. This current vector is input to a first signal multiplier function 72 along with a feedback signal representative of a real component of the series voltage vector or $e_d$, as this voltage vector $e_d$ is seen to be a function of control system output angle beta ($\beta$) which is an output of the control system output block 84. The control system output angle $\beta$ is a dynamic measure of how much the injected inverter voltage vector leads the line current vector and, as such, it affects the terminal power Pac. This is done through the real component of the series voltage vector $e_d$ with the cosine $\beta$ function block 88. The cosine $\beta$ function block 88 also introduces a proportionality constant $K_I$ which defines the ratio between the DC capacitor voltage determining the magnitude of the series AC voltage $v_c$ and the peak phase voltage on the AC side of the inverter.

The forward signal path through the first signal multiplier function 72 for the product of $i_{dqs}$ and $e_d$ is output through a scaler adjustment ratio block 78 which outputs 3/2 times the terminal power function Pac which enters a division function block 80 at reference point N. This block 80 has a divisor reference point D in feedback from the magnitude of the DC side voltage $v_c$. This signal $v_c$ also is sent back through the feedback signal multiplier function 74 along with the output of the control angle $\beta$ system output cosine function in order to form the real component of the series voltage vector $e_d$. The division of the reference point signals $N/D = P_{ac}/v_c$ provides an output current $i_{cap}$ which is the instantaneous capacitor current which equals the voltage on the DC side of the voltage-source inverter when it is integrated in the capacitor. When $i_{cap}$ passes through the integrator function block 82 with a function 1/sC, a voltage $v_c$ results, where s in the denominator is the function operator or transformation for integration. The variable $v_c$ is thus the instantaneous capacitor voltage, since the current is integrated by the capacitor bringing about a change in the DC capacitor voltage. Thus $v_c$ directly determines the value of the series AC voltages $e_a$, $e_b$, $e_c$.

The output signal $e_q$ from the output signal multiplier function 76 is for the product of the instantaneous capacitor voltage $v_c$ and the output of the control angle $\beta$ system output sine function block 86. This result in an instantaneous vector component signal $e_q$ for the AC voltage vector in quadrature (90° phase difference) with the instantaneous line current vector $i_{dqs}$. The control system output angle $\beta$ is used to regulate the magnitude of $e_q$ since it is this angle $\beta$ that can be changed rapidly and arbitrarily as the only control input to the system. In this analysis it has been assumed that the harmonic voltages generated by the voltage-source inverter are neglected, and an instantaneous balance was assumed between the power on the AC-side and DC-side of the inverter. The meaningful result of this representation in the control flow diagram of FIG. 3 is in terms of the ratio of the instantaneous vector component of the AC voltage, which is the reactive component of the series voltage vector $e_q$, divided by the single vector current $i_{dqs}$. This is a measure of the instantaneous reactive impedance; the impedance is presented by the voltage-source inverter to the transmission line system according to the next equation.

$$Z_{inst} = \frac{e_q}{i_{dqs}} \qquad \text{Eq. (6)}$$

The above analysis also is predicated on the basis that the single vector current $i_{dqs}$ is an independent variable for the transmission line system. The transmission line currents are substantially determined by extraneous factors such as those mentioned hereinabove, now briefly again listed as line to line or line to ground fault-bridging events, large loads switched on and off, and an insertion or deletion of some power generators, as well as transmission lines being switched on and off. Since there is an instantaneous balance assumed between the power on the AC-side and DC-side which defines the instantaneous capacitor current $i_{cap}$, the control angle $\beta$ must be held to $\pm \pi/2$ on average, with relatively small deviations about this value in order to maintain the required DC voltage.

External Control Interface To Internal Control

An external control interface 126 to internal control flow diagram 100, according to the invention shown in FIG. 4, is generally based on the control flow diagram for series compensation described with respect to FIG. 3. In the internal control 100 feedback signals $i_{dqs}$ and angle ($\theta$) are used. The instantaneous current $i_{dqs}$ is the transmission line current vector output from a vector magnitude calculator 94, and $\theta$ is the angle of the line current vector signal obtained by vector phase-locked loop tracker 96, which closely tracks the angular rotation of the current vector. Both the vector magnitude current calculator 94 and the angle of line current vector, phase-locked loop tracker 96 receive the same pair of inputs $i_{ds}$, $i_{qs}$ which have been previously defined as the orthogonal or perpendicular current components used to describe the three line currents $i_a$, $i_b$, $i_c$ simultaneously. These orthogonal currents are output from a transmission line current vector resolver 92 which are concurrently fed by these respective transmission line phase currents.

The transmission line current vector resolver 92 provides the derived perpendicular output currents $i_{ds}$, $i_{qs}$ from a matrix definition which combines a fractional proportional scaler adjustment of current $i_a$ with $\frac{1}{2}$ thereof at box 142 summed into a third summer-differencing interface 145. Also combined are the difference of both line current $i_b$, $i_c$ with a fractional proportional scaler adjustment of ⅓ to each of the signals at 143, before difference entering the third summer-differencing interface 145. This is done in order to provide the output component of current $i_{ds}$ to input the feedback vector current calculator 94 and also to input the angle vector phase-locked loop tracker 96. Both of these latter transmission line currents $i_b$, $i_c$ are also given a fractional proportional scaler adjustment of $1\sqrt{3}$ at 144, before being combined in the fourth summer-differencing interface 147, with the fractional proportional value of $i_b$ becoming negative with respect to the positive fractional proportional value of $i_c$ which is then output as perpendicular current vector component $i_{qs}$. This quadrature current is input into the vector current calculator 94 which combines the sum of the squares and takes the square root of same at function 162 in order to provide the feedback current vector $i_{dqs}$ which is thus generated from the actual current measurements constituting an independent input variable.

A more tortuous calculation occurs in order to define the feedback angle $\theta$ of the line current vector signal in the vector phase-locked loop tracker 96. It is sufficient to say that the perpendicular current vector components $i_{ds}$, $i_{qs}$ each are input to respective first and second multiplier function junctions 148, 152 which are also input by respective cosine and sine functions of control system angle $\theta$ functions 150, 154. Then the output of the multiplier junctions 148, 152 enter as respective positive and negative inputs to summer-differencer interface 156 which has an output feed path through a proportional plus integral function 158. A constant $K_a$ and a constant $K_b$ for the integral portion is added thereto, as designated by the transformation integral operators s in the denominator of this function.

The constants $K_a$, $K_b$ represent gain constants which are chosen to set the bandwidth of the phase-locked loop and are dependent on the synergism of system components which are selected in order to practice the invention according to the methodology as defined above. The output of the proportional plus integral function from block 158 passes through an integrator output function 160 which provides the feedback angle output of line current vector signal $\theta$ which is directly input to a summer output interface 122 in the internal control portion 100. This output interface 122 is used to inject the compensating series voltage to the final operator for the transmission line.

The expedient for this is through the setting of an average value control switch 120 which is set to make the average value of $\beta$ either $+\pi/2$ or $-\pi/2$. This corresponds to a control system output angle which has been previously defined as a dynamic measure of how much the injected inverter voltage vector leads the line current vector. Although the average value of $\beta$ is provided at $\pm\pi/2$, the deviation of $\beta$ in one direction draws positive real power, and the deviation in the other direction draws negative real power. This is in contrast with imaginary power or Volts-Amps Reactive (VARS) which is in quadrature with real power in watts.

The summation of the control system output angle $\beta$ with the feedback angle of the line current vector $\theta$ through the summer output interface 122 provides the total control system output angle $\phi$. This angle $\phi$ is better to be considered as a function f ($\phi$) which provides the voltage-source inverter voltage vector which is adapted to lead the line current vector. It is used to determine the state of the switches in the inverter by affecting an inverter switching-state look-up table 124 which is the output operator providing the timing sequence signals, for the inverter 50 shown in FIG. 2, on the control firing signal lines 61a–61c, and 63a–63c.

The external control interface 90 is constituted by an external input control function 126 which interfaces the transmission currents $i_a$, $i_b$, $i_c$ which are brought into a line current analyzer and line stability control 127 along with a defined pair of line-to-line voltages $v_{ab}$, $v_{cb}$. These are a relevant pair of transmission line voltages for the control 127 to carry out the measurements and analysis of the system parameters for the purpose of establishing the degree of series compensation required. The line current analyzer and line stability control 127 outputs a reactance demand signal $X^*$ on line 128 and outputs a fundamental line current amplitude measurement $I_f$ on line 134 with this latter signal forming an input to a multiplier function junction 106.

The multiplier junction 106 also is input by an absolute value function 102 for the reactance demand signal $X^*$ on the line 132, and the product of these two signals form at the output of the multiplier junction 106, a signal $e^*$. This signal $e^*$ is the desired series voltage which is computed from the product of reactance demand $X^*$ and the fundamental line current amplitude $I_f$. The magnitude of the desired series voltage $e^*$ enters at the summer input of a first summer-differencing interface 108 while a differencing signal $v_c$, which it will be recalled from the analysis of FIG. 3 and similarly here, is the magnitude of the DC capacitor voltage which directly determines the magnitude of the series AC voltage. This voltage $v_c$ serves as an additional feedback control input variable to the present internal control flow diagram for the series compensation system.

In the present internal control flow of signals described with respect to FIG. 4, the reference point N defines the error signal corresponding to the reference point computed from the magnitude of the desired series voltage $e^*$ minus $v_c$, which is the instantaneous capacitor voltage after integration as defined above. The reference point D constitutes the divisor in a divider function block 110 for N/D, and it utilizes the transmission line current vector feedback signal $i_{dqs}$ on line 136 as D after it undergoes a scaling function change in block 98. The output of the divider function 110 is forwarded to a proportional plus integral function box 112 having a constant proportional factor of $k_1$ and a integral constant of $k_2$ seen to be divided by the integration operator transform s. The output signal alpha ($\alpha$) from function 110 is a proportional plus integral output function which is further processed by inversion through a second summer-differencing interface 114. This interface 114 is provided with a positive summer input of $\pi/2$ with the output of the second summer-differencing interface 114 then passing through inversion function 116 and responding to an average value terminal switch 120 setting representing logic "1". This logic setting indicates that the average value of the control system output angle $\beta$ has a negative average value or a minus $\pi/2$ in this setting, while on the direct line 118 for logic zero setting, $\beta$ will have a positive average value of $\pi/2$.

The remaining feed-forward path of the reactance demand measurement $X^*$ on line 128 passes through a feed-forward step input function block 104 so that its output on line 138 is fed forward to the average value control switch 120 in order to contact it when set to a logic "1" position. The negative average value or minus $\pi/2$ is thus presented for the control system output angle $\beta$ which has been described previously to indicate that a deviation of $\beta$ in one direction draws positive real power and a deviation in the other direction draws negative real power. This is in order to influence the total control system output angle $\phi$ for the injected inverter voltage vector which may either lead the line current vector or otherwise lag it.

The contents of the look-up table within the inverter switching-state look-up table 124 corresponds in he alternative to different possible inverter topologies, as well as two different harmonic reduction schemes. In all these cases, the input angle $\phi$ and the output of the series inverter control circuit 60 in FIG. 2 is a set of switch states that are fed to the gate drive circuits that control the actual GTO switching devices along with their freewheeling diodes in inverse parallel therewith as previously described. The present external interface to internal control flow diagram 100, as described for the voltage-source inverter, acts characteristically as a transmission line power amplifier which reproduces authentically a reference signal of voltage or impedance with the most appropriate instantaneous magnitude and phase. This is done in order to deliver the required power level by controlling the overall effective line impedance with the necessary transient and dynamic stability for each selected mode of operation in high voltage electric power systems.

Figure 6A:
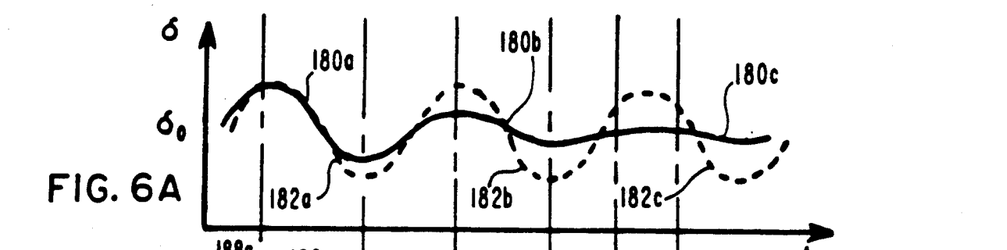
FIGS. 6A, B, C are graphic representations respectively of the time function relationships of transmission angle δ, transmitted electrical power P, and the output of the series compensator S for maximizing dynamic system stability.
Figure 6B:
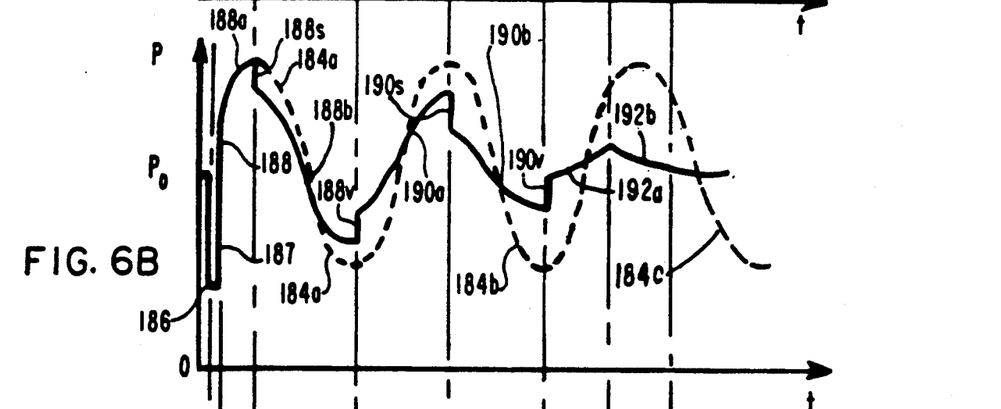
Figure 6C:
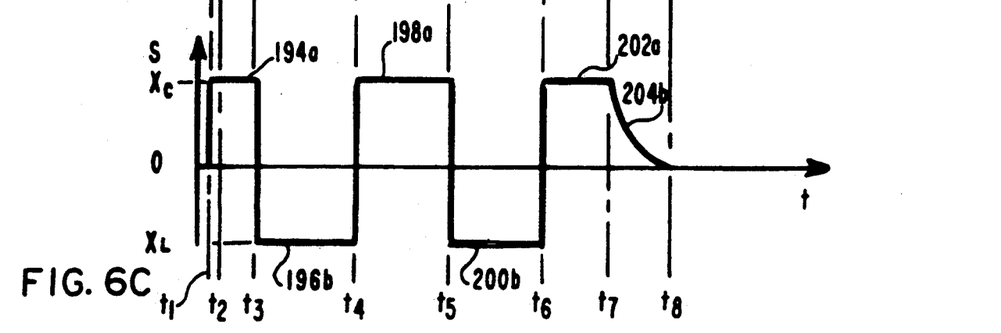

One of the ways to understand the transmission line response in terms of transient and dynamic stability is that an electric power system can recover normal operation with transient stability following a major disturbance such as a fault or loss of generating power. Dynamic stability, moreover, is being able to recover normal operation following a minor disturbance that initiates power oscillation. This is seen in the latter case in terms of whether or not the electric power system has positive damping. The FIGS. 6A, 6B, 6C are now referred to for understanding in terms of transient and dynamic electric-power stability. These figures are respectively time-function relationships for transmission angle $\delta$, in FIG. 6A; transmitted electric power P in FIG. 6B; and in FIG. 6C, the output of the voltage-source inverter series compensators shown in FIGS. 2–4 for , maximizing dynamic system stability.

It will be helpful to again refer to FIG. 5 which has been previously described hereinabove for its showing of a Power Engineering sine-like curve 170 which graphs power as a function of transmission angle $\delta$, representing the difference in phase angle between a sending end machine rotor and a receiving end machine rotor. The relationship of Eq. (1) expresses the characteristic of the curve 170 in FIG. 5 so that if the terminal voltage of a transmission line sending end machine is exactly in phase with the terminal voltage of the transmission line receiving end machine, there is no possibility for the transfer of real power. This means that the sin $\delta=0$, and there is no power transferred between the two machines. If, however, there is a phase difference between the sending end and receiving end machines, such as at $\delta_1$, $\delta_m$, $\delta_2$, where the sign of angle $\delta$ is increasingly nearer to unity value which at $\delta=90°$ is unity and, as such, the power increases to a maximum. It descends the sine curve and decreases in power magnitude as the transmission angle increases from 90° to 180°.

The dashed-line oscillations in FIG. 6A represent an undamped transmission angle $\delta$ represented by a series of sine waves 182a, 182b, 182c. The system is totally undamped in this showing, and it corresponds to system Power P oscillating between the values in FIG. 5 from $P_1$ to $P_2$, passing through $P_m$, which correspond to points $\delta_1$ passing through $\delta_M$ to $\delta_2$ and respective power points 176, 172, 174. The power is seen to oscillate between these points on the power curve 170 if there were no damping at all. If damping is provided, however, the series of sine curves in FIG. 6A is shown to be a sine wave of diminishing amplitude in each cycle as shown by curve portions 180a, 180b, 180c. The last cycle 180c shows that the transmission angle has returned to a value of about $\delta_o$ with stable power transmission value of about $P_M$ or thereabouts.

A fault on a transmission line is a temporary short circuit which may again be represented in terms of undamped transmission line in which power oscillates forever. This is shown by the curve in FIG. 6B with steady power oscillation P represented by the sine wave power cycles in dashed curves 184a, 184b, 184c. Curve 184a which began at point 188 at approximately time $t_2$ which represents the time appointed when the fault clears in the system. This assumes that the fault has occurred at time $t_1$ indicated by the power curve having reached its lowest point after the fault occurs having formerly been at a value of $P_o$ when time equals zero.

The present invention is seen to operate in FIG. 6C which represents the series compensation curve introduced by the voltage-source inverter shown in FIGS. 2–4. It is represented by compensating the series electric transmission line with a step-like function portions 194a, 198a, 202a which are located above the abscissa (x-axis) corresponding to capacitive reactance values $X_C$. A trailing portion of the curve 204b shows a reducing capacitive reactance value $X_C$ during a period when the stepwise capacitive reactive positive damping in the transmission line system is no longer needed because the transients have been reduced sufficiently. The negative step functions 196b, 200b in FIG. 6C correspond to inductive reactance components $X_L$ of the series compensation function provided by the voltage-source inverter. This is also required for limiting the first cycle after the fault has cleared, according to the synchronized timing of the transcending power oscillations shown above in FIG. 6B. These correspond to the periods $t_3-t_4$ and $t_5-t_6$.

The step function series compensation relationship is shown and is termed in the relevant art as a "bang-bang" methodology, since it reverses polarity appropriately in step with the transitions between alternately increasing power and positive power time intervals $t_2-t_3$, $t_4-t_5$, $t_6-t_7$ which require a capacitive reactive series compensation in order to affect the magnitude of the power oscillation as between time interval $t_2-t_3$. The reversing to an inductive reactive series compensation during the descending portion of curve 188 is in the first cycle following the short circuit fault shown in the time interval $t_3-t_4$ in the curve of FIG. 6B. During the time interval $t_4-t_5$ the series compensation function 198a in FIG. 6C becomes capacitive reactive and likewise for time interval $t_6-t_7$ as shown by the step function 202a, after which time it trails off according to the curve function 204b during the time interval $t_7-t_8$. The interval, not specifically accounted for in the above analysis is the inductive reactive $X_L$ portion 200b during the time interval $t_5-t_6$ which governs the decreasing portion of the power curve 190b, which is seen to be diminished in amplitude, so responding to the positive damping by comparison with respect to the first cycle of damping represented by the curved portion 188b. Likewise, the further damping effect is evident in curve portion 192b which succeeds the first two cycles of operation after the fault.

The higher the magnitude of series compensation in either the capacitive reactive or the inductive reactive directions, respectively above and below the horizontal axis, corresponds to a greater potential dynamic response to the situation on the transmission line. Increasing the network impedance is by adding inductive reactance when the result desired is to reduce the transmitted power, such as during the time interval t3-t4 when the machines are decelerating and during which time there is a surplus of mechanical power. It is desirable to increase the electric power to take over the mechanical power as in the time interval starting at t3 at which time the step function for inductive reactance 196b provides the additional inductive reactance in series with the inductive reactance already in the transmission line. The power curve response to this negative compensation step at time t3 is by the instantaneous drop of power P as shown by vertical curve segment 188s before the smoothly descending solid curve portion 188b during which time the machines are decelerating.

Another forced change occurs at the time t4 which causes a vertical jump in the curve 188v in the power P before the smoothly ascending portion of the curve 190a continues into the second cycle after the fault has been cleared. Another vertical drop in the power curve occurs at time t5 as indicated at 190s which is followed by a smoothly descending curve portion 190b which again corresponds to decelerating machines with a surplus of mechanical power. The inductive reactive compensation step 200b operates to increase the electric power to take over the surplus of the mechanical power. Before the second cycle of recovery after the fault has been completed, such as at time t6, a vertical rise in the power 190v again is the result of the step change of the capacitive reactance curve 202a which results in the smoothly ascending power curve 192a. This becomes a smoothly descending power curve portion 192b at time t7 which is the result of the decreasing capacitive reactance curve portion 204b.

The net effect of the series capacitive reactive compensation is to increase the series compensation when the electric power is increasing, which corresponds to the initial capacitive reactance portion 194a at time t2 and subsequently during the transitions at time t4 and t6. The insertion of the capacitive reactance step function which is injected in the electric transmission line power system immediately after the fault clears, such as in the first cycle of operation, minimizes the machine acceleration and also minimizes the angle of change of δ. Otherwise an angle change of δ occurs in an undamped fashion resulting in subsynchronous oscillations and great potential damage to the equipment protected by the present invention.

The invention responds appropriately to the situation after a fault with increasing machine speed during the interval of time t2-t3 immediately followed by decreasing machine speed at time t3 which is again repeated decreasing speed around times t5 and t7. Decreasing to increasing machine speeds occur around time t4 and time t6.

In contrast with the "bang-bang" injection of series impedance compensation, a sinusoidal modulation of impedance or some other patterned modulated impedance curve can be substituted for the preferred embodiment in order to make the most effective use of positive damping in the shortest possible time within the limit rating of the voltage source. This is applied in order to minimize the machine acceleration and to minimize the change of the transmission angle. The frequency of oscillation of the compensation impedance may be, for example, about 1 to 2 Hertz, although frequency values up or down outside of this range are also likely and are likewise anticipated. It is the goal of minimizing the magnitude of "the first swing" which is seen as the maximum achievable transient stability, and this requires that the series compensator has to control the impedance presented in series with the transmission line so as to oppose the angular variation of the transmission angle δ between the sending and receiving end voltages.

It has been discovered that the derivative of the transmission angle δ is proportional to the integral of the variation of the real electric power P which is represented in Eq. (4) and as such is transmitted power. The product of the single vector current $i_{dqs}$ feedback from the vector magnitude calculator 94 in FIG. 4, when multiplied by the real component of the series voltage vector signal $e_d$ in FIG. 3, affects the terminal power signal $P_{ac}$ so that the real electric power can be computed. The rate of change of the transmission angle dδ/dt can be derived by simple integration. The derivative of the angle δ being negative when the disturbed machine is accelerating because the mechanical input power is greater than the transmitted electrical power. Therefore, to increase the transmitted electrical power, the overall transmission line impedance, which may include fixed series capacitive compensation, must be decreased. This can be accomplished with the voltage-source inverter increasing the controllable capacitive compensating impedance. But when the derivative of the angle δ is positive, the overall transmission line impedance must be increased with the controllable voltage-source inverter. Compensation is made to be inductive-reactance so as to make the output of the series compensator control between its maximum capacitive and inductive reactance output in order to provide maximum damping.

The series compensator can also be used to minimize transmission line fault current by making the injected controllable line impedance maximum inductive reactance when the line currents measured exceed a predetermined leve. The reactive impedance reference signal is immediately forced to its maximum inductive value until the fault is cleared, whereupon the reference signal is allowed to assume its value determined by other system parameters.

The usefulness of the present invention is extended to the damping of subsynchronous oscillations which occur when the resonant frequency of a line compensated with a series capacitor coincides with a side-band frequency which results from the modulation of the system frequency of for example 60 Hz. The 60 Hz frequency is considered to be a "carrier frequency" modulated by one of the mechanical resonant frequencies of the generator and turbine combined system according to a well-recognized expression in terms of angular frequency difference, $\Delta\omega = \omega_F - \omega_M = 1/\sqrt{L_S C}$. The controllable series compensator injects a voltage component with the same Δω side-band frequency and with a polarity such as to oppose the flow of line current at that frequency so that it is effective to damp subsynchronous oscillation. The required modulating signal can be obtained from a shaft speed sensor or by the measurement of system frequency which is then used to modulate the reference signal.

The present invention can also be used to compensate for differences or inaccuracies in the compensation by fixed series capacitor banks in multi-phase parallel transmission line systems as well as to compensate for failures in the capacitor banks. The controllable series compensation unit with the voltage-source inverter added to each fixed capacitor bank can be used to equalize line impedances and thereby provide current sharing by measuring the magnitude of the current in each of a plurality of parallel lines N in number. The individual current magnitudes are summed and then divided by N which is the desired magnitude of current for each line, and the average magnitude is then compared to the actual transmission line current magnitude in order to provide an error signal. A compensation factor is called for by the error signal which is then amplified and provided to control N−1 controllable series compensators but not to all of the N series compensators. This one less compensator to control is done in order to avoid an over-definition for current sharing so as to affect N−1 control loops which indirectly define the current for the Nth line.

While the present invention has been described with respect to a particular physical embodiment, the invention is not limited to the particulars described above; instead, the scope of the invention is defined by the following claims.

What is claimed is:

1. A transmission line impedance compensation system for dynamically balancing a phase-quadrature or reactive voltage component on the transmission line responsive to demand, said system comprising:

compensating means coupled in series with the transmission line and being adapted to introduce or inject a phase-quadrature voltage component, ancillary to the transmission line reactive voltage component for a predetermined operating frequency;

control means for adjusting said compensating means to stabilize the magnitude and phase of a resultant phase-quadrature voltage for the injected voltage component with the transmission line reactive voltage component, substantially in phase quadrature leading or lagging phase angles with respect to transmission line voltage and current parameters, said compensated transmission line having a corresponding adjustment for the real power (P) and reactive power (Q) components in order to provide transient and dynamic stability without incurring subsynchronous resonance.

2. The impedance compensation system as set forth in claim 1, wherein said compensating means includes means for detecting whether a disturbed machine is actively connected in the transmission system, said machine disturbance being evidenced by accelerating or decelerating rotational machine speeds based upon a measurement of the steady-state transmission angle ($\delta$) that is the phase angle between the transmission line sending end and receiving end voltages.

3. The impedance compensation system as set forth in claim 2, wherein said means for detecting said machine disturbance recognizes if the sign of the mathematical derivative of the transmission angle is positive or negative, said signed transmission angle being proportional to the integral of the variation of real electric power transmitted.

4. The impedance compensation system as set forth in claim 3, wherein the derivative of the transmission angle having a negative sign corresponding to a condition of acceleration of the disturbed machine with the mechanical input power taken to be greater than the transmitted electrical power to signal the need for decreasing the transmission line inductive reactive impedance and, conversely, the derivative of the transmission angle having a positive sign corresponding to a condition of deceleration of the disturbed machine with the mechanical input power taken to be less than the transmitted electrical power which signals the need for increasing the transmission line inductive reactive impedance.

5. The impedance compensation system as set forth in claim 4, wherein the derivative of the transmission angle, the transmitted electrical power and the output phase-quadrature voltage of the compensating means ($e_q$) is controlled between the maximum capacitive and inductive reactance output voltage in order to minimize the "first cyclic-swing" of these parameters in order to achieve the maximum transient and dynamic stability for the transmission line.

6. The impedance compensation system of claim 1, wherein said compensating means includes a voltage source inverter operating with minimized real power requirements and connected to said control means for generating an AC output voltage waveform having a controlled predetermined amplitude and phase angle for series insertion in the transmission line in order to achieve the predetermined degree of compensation for stabilization.

7. The impedance compensation system as set forth in claim 6, wherein said control means includes plural feedback sensors affecting said control by sensing input transmission line voltage, current, rotational velocity, and frequency parameters representative of a rotating machine connected in the transmission line power transmission system.

8. The impedance compensation system as set forth in claim 7, wherein said plural feedback sensors are coupled to said transmission line with transformer means providing input connections to said control means.

9. The impedance compensation system as set forth in claim 7, wherein said control means for controlling the injection by said compensation means controls the magnitude of the phase-quadrature series component output voltage waveform, a phasor voltage quantity being affected by a constant multiplier $K_I$ of a control angle parameter ($\beta$) which is the angle by which the inverter voltage vector leads the line current vector, where $K_I$ is the ratio between a DC capacitor voltage and the peak phase voltage on the AC-side of the inverter, and the control angle parameter is arbitrary and rapidly changeable as a primary control input to determine the terminal power $P_{ac}$ of the transmission system line impedance compensation system.

10. The impedance compensation system of claim 1, wherein said compensating means includes a solid-state switching power converter selected from the class of DC to AC converters known as "voltage-source inverters" operated from an energy storage capacitor.

11. The impedance compensation system of claim 10, wherein said solid-state switching power converter includes a plurality of self-commutated GTO semiconductor switches, each of said GTO switches being connected across a parallel shunting circuit including a reverse poled freewheeling diode.

12. The impedance compensation system as set forth in claim 1, wherein the transmission line system includes a plurality of parallel transmission lines, each said transmission line including a lumped capacitor bank in series circuit for effecting transient stability, and said controllable compensating means includes a like plurality of distributed per-line compensating units for providing each transmission line with a series compensation voltage for each transmission line in a multi-phase power distribution system.

13. The impedance compensation system as set forth in claim 12, wherein said controllable series compensation means includes means for sensing shaft speed or system oscillation frequency of an affected machine in a generator-turbine system which generates a resonant subsynchronous frequency oscillation having a sideband frequency resulting from the carrier frequency modulated with one of the mechanical resonant frequencies of the machine in the generator-turbine system.

14. The impedance compensation system of claim 1, wherein the substantial phase quadrature for leading and lagging phase angles of the resultant phase-quadrature voltage being controllable substantially about zones defined at each of $+90$ and $-90$ electrical degrees.

15. The impedance compensation system of claim 1, wherein said compensating means for injecting a phase-quadrature voltage component into said transmission line provides Volt-Amps Reactive (VARS) and corresponds to either an absorptive or a generated component output from a GTO inverter switch carrying a 90 degree segment of the output current in each cycle.

16. The impedance compensation system as set forth in claim 1, wherein said compensating means includes means for minimizing transmission fault current by measuring the magnitude of the line current to determine if it exceeds a predetermined level, and upon such a precondition, said minimizing means controllably injecting a predetermined maximum amount of inductive reactance into the transmission line until the fault has cleared and then reestablishing controlled compensation for resumed transient and dynamic stability.

* * * * *